(12) United States Patent
Foisy

(10) Patent No.: US 8,156,633 B1
(45) Date of Patent: Apr. 17, 2012

(54) TRANSPORT COMB FOR HEAD STACK ASSEMBLY

(75) Inventor: Gregory G. Foisy, Tracy, CA (US)

(73) Assignee: Western Digital Technologies, Inc., Irvine, CA (US)

(*) Notice: Subject to any disclaimer, the term of this patent is extended or adjusted under 35 U.S.C. 154(b) by 982 days.

(21) Appl. No.: 12/047,284

(22) Filed: Mar. 12, 2008

(51) Int. Cl.
*G11B 5/127* (2006.01)
*H04R 31/00* (2006.01)

(52) U.S. Cl. ............... 29/603.03; 29/603.04; 29/603.06; 29/603.07; 360/244; 360/264.3; 360/265.7

(58) Field of Classification Search ............... 29/603.03, 29/603.04, 603.06, 603.07, 737; 360/244, 360/264.3, 265.7, 317
See application file for complete search history.

(56) References Cited

U.S. PATENT DOCUMENTS

| | | | |
|---|---|---|---|
| 4,851,943 A | | 7/1989 | Perry |
| 5,482,164 A | * | 1/1996 | Karns ............... 206/728 |
| 5,826,325 A | | 10/1998 | Price et al. |
| 5,984,104 A | * | 11/1999 | Schott et al. ............ 206/728 |
| 6,344,950 B1 | | 2/2002 | Watson et al. |
| 6,452,753 B1 | | 9/2002 | Hiller et al. |
| 6,577,473 B1 | | 6/2003 | Macpherson et al. |
| 6,687,093 B1 | | 2/2004 | Butler et al. |
| 6,862,154 B1 | | 3/2005 | Subrahmanyam et al. |
| 6,941,642 B1 | | 9/2005 | Subrahmanyam et al. |
| 6,966,107 B2 | | 11/2005 | Jones |
| 7,193,819 B1 | | 3/2007 | Chen et al. |
| 2003/0159273 A1 | | 8/2003 | Jones |
| 2005/0223547 A1 | | 10/2005 | Pfeiffer et al. |
| 2006/0117558 A1 | | 6/2006 | Koh et al. |
| 2007/0030599 A1 | | 2/2007 | Son |
| 2007/0163105 A1 | | 7/2007 | Son et al. |

* cited by examiner

*Primary Examiner* — Paul D Kim

(57) ABSTRACT

An HSA transport comb includes an alignment pin extending from the comb body into a tooling hole of the actuator arm, and a separator finger in contact with a suspension assembly of an HGA with the transport comb in a second angular orientation with respect to the actuator arm, but not in a first angular orientation. The transport comb includes a restraining tower extending into a mass-reduction opening of the actuator arm. The restraining tower includes a first lobe that fits within the mass-reduction opening with the transport comb in the first angular orientation, but not with the transport comb in the second angular orientation. The restraining tower also includes a first neck that fits within the mass-reduction opening with the transport comb in either angular orientation, and has a neck height that is greater than the actuator arm thickness.

16 Claims, 6 Drawing Sheets

TRANSPORT COMB FOR HEAD STACK ASSEMBLY

FIELD OF THE INVENTION

The present invention relates generally to the manufacture of information storage devices, and in particular to a transport comb used for storing, shipping, and handling a head stack assembly (HSA) during disk drive manufacture.

BACKGROUND

The typical hard disk drive includes a head disk assembly (HDA) and a printed circuit board assembly (PCBA) attached to a disk drive base of the HDA. At least one disk is rotably mounted to the disk drive base via a spindle motor. The PCBA includes electronics and firmware for controlling the rotation of the spindle motor, controlling the angular position of an actuator that positions a head stack assembly (HSA) to which it belongs, and for providing a data transfer channel between the disk drive and its host.

During operation of the disk drive, the actuator must rotate to position head gimbal assemblies (HGAs) of the HSA adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, typically a pair, to form a voice coil motor (VCM).

Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a minor and an objective lens for focusing laser light on to an adjacent disk surface. The head is adhered to a suspension assembly that includes a gimbal, load beam, bend region, and swage plate. The suspension acts to preload the head against the surface of the disk. The preload force is often referred to as the "gram load." It is desirable that the gram load does not vary excessively among a population of HGAs, because the gram load affects the air bearing thickness and therefore also affects the performance of the head.

However, the gimbal or bend region of one or more suspension assemblies in a population of HGAs may be inadvertently deflected beyond its elastic limit during the handling that is associated with disk drive manufacture. Such handling damage can cause the gram load, and/or other suspension assembly characteristics that affect the air bearing (e.g., pitch static attitude, roll static attitude), to vary excessively within the population of HGAs, adversely affecting disk drive performance, manufacturing yield, and/or reliability.

In part to reduce the opportunity for handling damage, a transport or "shipping" comb is typically installed in an HSA sometime before the HSA is assembled into the disk drive. For example, often HSAs are first assembled in a different manufacturing facility than where the HDAs that incorporate such HSAs are later assembled. After the transport comb is installed in an HSA, the transport comb typically serves to protect the HSA from handling damage during transport (e.g., by preventing the heads from contacting each other). The transport comb also typically serves to separate the heads from each other enough to facilitate merging of the HSA into the disk drive during disk drive assembly (e.g., to allow the disks or ramp surfaces to merge between the heads during disk drive assembly), but not to separate the heads from each other so much that the bend areas of the suspension assemblies are thereby plastically deformed. The transport comb is then typically removed from the HSA during HDA assembly after the merging step described above.

Unfortunately, the HSA is not as well protected from handling damage before or during installation of the transport comb into the HSA. For example, the person installing a conventional transport comb into an HSA must ensure that the separator fingers of the transport comb do not rotate into contact with the suspension assemblies until the transport comb is at the correct axial position to properly separate the heads. If the person rotates the transport comb (to engage the separator fingers with the suspension assemblies) at the wrong axial position, then a separator finger may strike the side of a suspension assembly and/or deflect a suspension assembly beyond its elastic limit. Thus, there is a need in the art for a transport comb that reduces the risk of damage to an HSA during installation of the transport comb (into the HSA).

SUMMARY

A head stack assembly (HSA) for a disk drive is disclosed and claimed. The HSA includes an actuator having an actuator body and an actuator arm extending from the actuator body. The actuator arm includes a tooling hole and a mass-reduction opening, and defines an actuator arm thickness adjacent the mass-reduction opening. The HSA includes a head gimbal assembly (HGA) attached to the actuator arm. The HGA includes a read head and a suspension assembly supporting the read head. The HSA includes a transport comb during a phase of manufacture of the disk drive. The transport comb includes a comb body and an alignment pin extending from the comb body into the tooling hole of the actuator arm. At least one separator finger extends from the comb body. The separator finger is not in contact with the suspension assembly of the HGA with the transport comb in a first angular orientation with respect to the actuator arm. The separator finger is in contact with the suspension assembly of the HGA with the transport comb in a second angular orientation with respect to the actuator arm. The transport comb includes a restraining tower extending from the comb body into the mass-reduction opening of the actuator arm. The restraining tower includes a first lobe that fits within the mass-reduction opening with the transport comb in the first angular orientation. The first lobe does not fit within the mass-reduction opening with the transport comb in the second angular orientation. The restraining tower also includes a first neck that fits within the mass-reduction opening with the transport comb in the first and second angular orientations. The first neck has a neck height that is greater than the actuator arm thickness.

DESCRIPTION OF THE PREFERRED EMBODIMENTS

Figure 1:
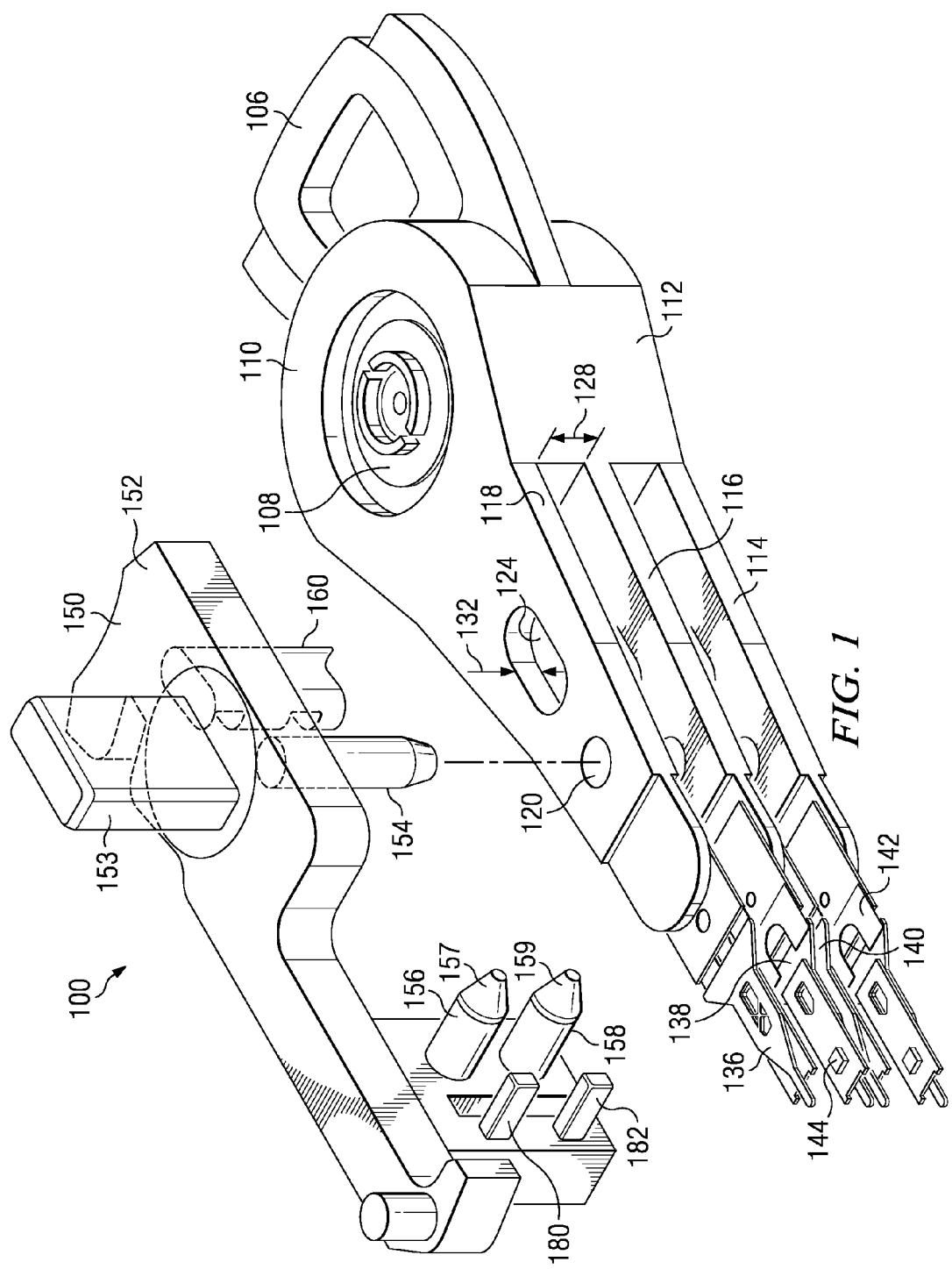
FIG. 1 is an exploded perspective view of a head stack assembly (HSA) with transport comb according to an embodiment of the present invention.
Figure 2:
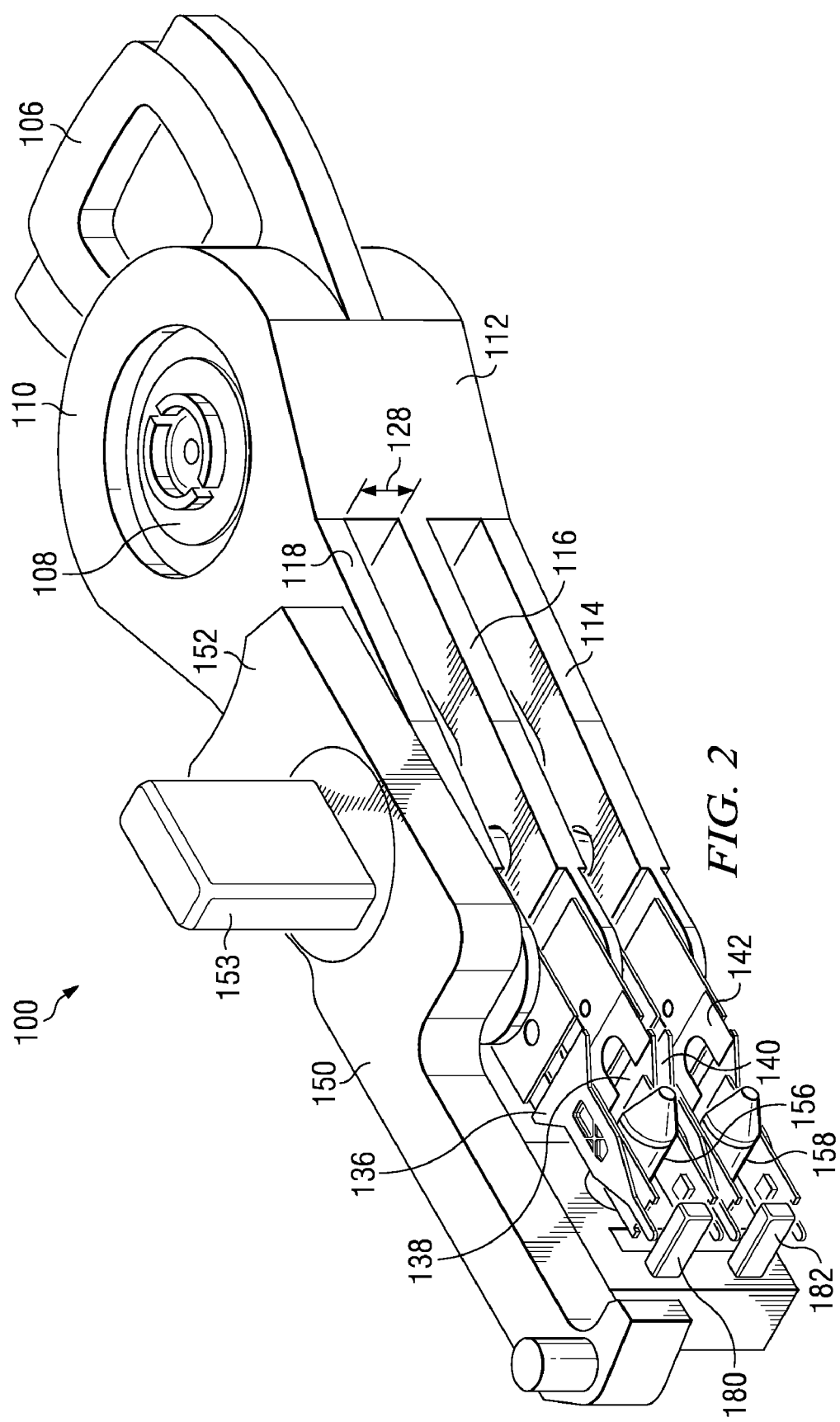
FIG. 2 is an assembled perspective view of the HSA of FIG. 1.

FIG. 1 depicts an exploded perspective view of a head stack assembly (HSA) 100. FIG. 2 depicts a non-exploded perspective view of the same HSA 100. The HSA 100 includes an actuator 110 that has an actuator body 112 and a plurality of actuator arms 114, 116, 118 extending from the actuator body 112. In certain embodiments, the actuator body may be fabricated of a metal material such as aluminum, stainless steel, magnesium, beryllium, or an alloy thereof, by casting, machining, and/or forging. The actuator 110 of FIG. 1 also includes a coil 106 and an actuator pivot bearing 108. Each of the plurality of actuator arms 114, 116, 118 includes a tooling hole 120 and a mass-reduction opening 124. In the embodiment of FIG. 1, the mass-reduction opening 124 is oval shaped, however the present invention contemplates that other shapes may be used for the mass-reduction opening (e.g., round, rectangular, oblong, irregular, triangular, or a combination of such shapes). Each of the plurality of actuator arms 114, 116, 118 is spaced apart from another by an actuator arm spacing 128, and defining an actuator arm thickness 132 adjacent the mass-reduction opening 124.

The actuator 110 as shown in FIG. 1 is intended for use in a disk drive (not shown) that would include two disks: an upper disk and a lower disk. Accordingly, in the embodiment of FIG. 1, head gimbal assembly (HGA) 136 is attached to actuator arm 118, HGAs 138 and 140 are attached to actuator arm 116, and HGA 142 is attached to actuator arm 114. In the embodiment of FIG. 1, each of the HGAs 136, 138, 140, and 142 includes a read head (e.g., read head 144 of HGA 138) and a suspension assembly supporting the read head (e.g., the rest of HGA 138 other than read head 144). However, it is contemplated that the present invention may be used with an actuator that is designed for use in a so-called depopulated disk drive, in which case one or more of the HGAs shown in FIG. 1 may be absent. For example, if the actuator 110 of the embodiment of FIG. 1 were to be used in a depopulated disk drive in which the lower disk were not present, then HGAs 140 and 142 may be absent (e.g., replaced with dummy masses that would attribute similar dynamic characteristics to the actuator arms 114 and 116). On the other hand, if the actuator 110 of the embodiment of FIG. 1 were to be used in a depopulated disk drive in which the upper disk were not present, then HGAs 136 and 138 may be absent (e.g., replaced with dummy masses that would attribute similar dynamic characteristics to the actuator arms).

The HSA 100 of the embodiment of FIG. 1 also includes a transport comb 150. The transport comb 150 includes a comb body 152 and an alignment pin 154 extending from the comb body 152 into the tooling hole 120. The comb body 152 may comprise a plastic material, for example a plastic material that is doped with a lubricant. One example of such a material would be a polycarbonate material doped with polytetrafluoroethylene (PTFE). Another example would be a polyetherimide material doped with polytetrafluoroethylene (PTFE). The comb body 152 may comprise a plastic material doped with a more electrically conductive material (e.g., a liquid crystal polymer material doped with carbon).

In the embodiment of FIG. 1 the alignment pin 154 preferably has a round cross-section and the tooling hole 120 is preferably round. However, other arrangements that preserve alignment might be used, such as a square or octagonal cross-section in a round hole or a round cross-section in a square or hexagonal hole. The transport comb 150 also includes separator fingers 156 and 158 that extend from the comb body 152. In the embodiment of FIG. 1, the separator fingers 156 and 158 include conical end regions 157 and 159, respectively, to enhance separation performance. However, in certain other embodiments, the conical end regions 157 and 159 may be replaced with a region that is tapered in other than conical fashion (e.g., flattened wedge) and/or a region that includes a blunted end portion.

In the embodiment of FIG. 1, the transport comb 150 may be rotated so that the separator fingers 156, 158 are not in contact with any suspension assembly of the plurality of HGAs 136, 138, 140, and 142. After such a rotation, the angular orientation of the transport comb 150 may be referred to as a "first angular orientation." However, the transport comb 150 may also be rotated so that the separator finger 156 is brought between and in contact with the suspension assemblies of HGAs 136 and 138, and the separator finger 158 is brought between and in contact with the suspension assemblies of HGAs 140 and 142. After such a rotation, the angular orientation of the transport comb 150 may be referred to as a "second angular orientation." In the embodiment of FIG. 1, rotation of the transport comb 150 from the first angular orientation to the second angular orientation may be facilitated by a finger grip 153 that extends from the comb body 152.

In the embodiment of FIG. 1, whether the transport comb 150 can be rotated into the second angular orientation is determined by the geometry of a restraining tower 160 that extends from the comb body 152 into the mass-reduction opening 124. Specifically, whether the transport comb 150 can be rotated into the second angular orientation is determined by the presence or absence of mechanical interference between the restraining tower 160 and an interior contour of the mass-reduction opening 124. Likewise, whether the transport comb 150 can be installed into the HSA 100 is also determined by the presence or absence of mechanical interference between the restraining tower 160 and an interior contour of the mass-reduction opening 124, so that such installation is permitted only when the separator fingers 156, 158 are angularly displaced away from the HGAs 136, 138, 140, and 142.

Figure 3:
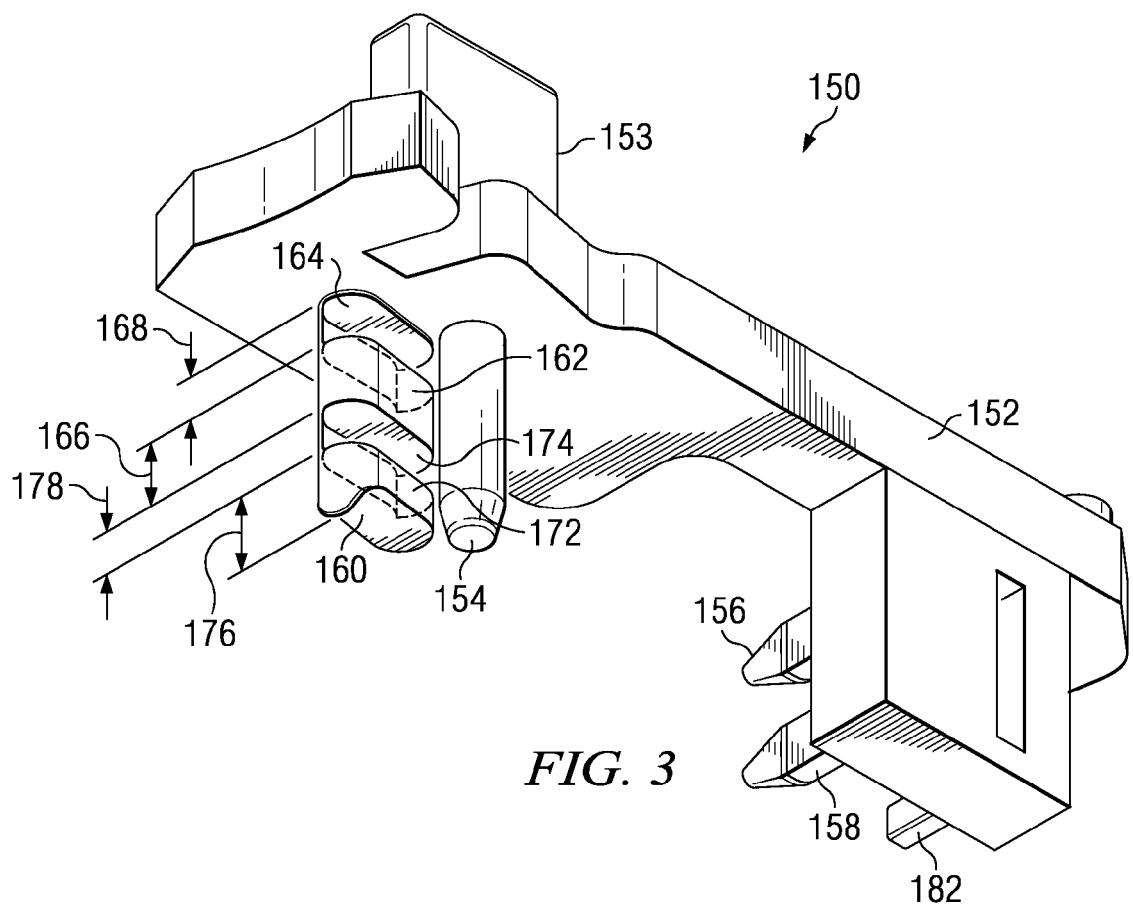
FIG. 3 is a perspective view of the transport comb of FIG. 1.

FIG. 3 is a perspective view of the transport comb 150 of the embodiment of FIGS. 1-2. The restraining tower 160 of the transport comb 150 has a first lobe 162 that fits within the mass-reduction opening 124 with the transport comb 150 in the first angular orientation. The first lobe 162 does not fit within the mass-reduction opening 124 with the transport comb 150 in the second angular orientation. The first lobe 162 has a lobe height 166 that is less than the actuator arm spacing 128. The restraining tower 160 includes a first neck 164 that fits within the mass-reduction opening 124 with the transport comb 150 in the first and second angular orientations. The first neck 164 has a neck height 168 that is greater than the actuator arm thickness 132. As shown in FIG. 3, the first neck 164 is not aligned with the center of the first lobe 162, but rather is aligned with a side of the first lobe 162. In this regard, the first lobe 162 of the embodiment of FIG. 1 need not be concentric about other portions of the restraining tower 160 such as the first neck 164.

In the embodiment of FIG. 3, the restraining tower 160 of the transport comb 150 also has a second lobe 172 that fits within the mass-reduction opening 124 with the transport comb 150 in the first angular orientation. The second lobe 172 does not fit within the mass-reduction opening 124 with the transport comb 150 in the second angular orientation. The second lobe 172 has a lobe height 176 that is less than the actuator arm spacing 128. The restraining tower 160 includes a second neck 174 that fits within the mass-reduction opening 124 with the transport comb 150 in the first and second angular orientations. In the embodiment of FIG. 3, the second neck 174 has a neck height 178 that is greater than the actuator arm thickness 132.

In the embodiment of FIG. 1, the transport comb 150 also includes a motion limiting projection 180 that, with the transport comb rotated into the second angular orientation, fits between (but under normal conditions does not contact) the suspension assemblies of HGAs 136 and 138. Under conditions of mechanical shock, the motion limiting projection 180 may help reduce the likelihood of contact between the heads of HGAs 135 and 138. Also in the embodiment of FIG. 1, the transport comb 150 includes a motion limiting projection 182 that, with the transport comb rotated into the second angular orientation, fits between (but under normal conditions does not contact) the suspension assemblies of HGAs 140 and 142. Under conditions of mechanical shock, the motion limiting projection 182 may help reduce the likelihood of contact between the heads of HGAs 140 and 142.

Figure 4:
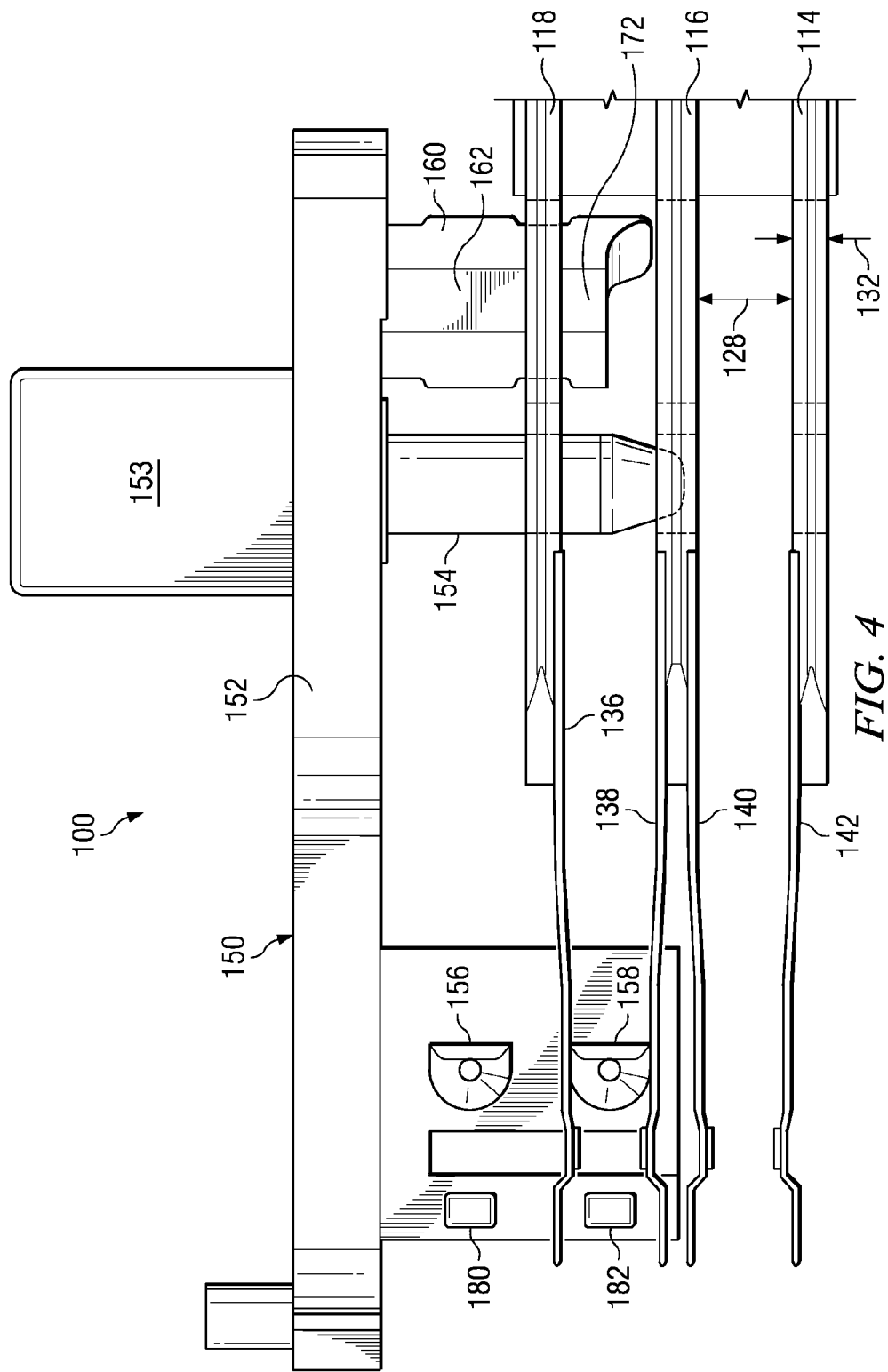
FIG. 4 is a side view of an HSA, with transport comb partially inserted, according to an embodiment of the present invention.

FIG. 4 depicts the HSA 100 with the transport comb 150 positioned such that the alignment pin 154 is partially inserted into the tooling hole 120 of actuator 110 and such that the restraining tower 160 is partially inserted into the mass-reduction opening 124 of actuator 110. More particularly, FIG. 4 depicts a specific amount of insertion which constitutes the first opportunity during insertion for the transport comb 150 to be rotated from the first angular orientation into the second angular orientation. Although it is possible to rotate the transport comb 150 into the second angular orientation with the partial insertion depicted in FIG. 4, this is not an intended use of the transport comb 150 because it would serve only to separate HGAs 136 and 138 from each other and would not serve to separate HGAs 140 and 142 from each other.

In the embodiment shown in FIG. 4, the spacing 128 between actuator arms 114 and 116 is preferably the same as that between actuator arms 116 and 118. In such an embodiment the lobe heights 166 and 176 shown in FIG. 3 are preferably but not necessarily equal. However, in an alternative embodiment the actuator arm spacings and the lobe heights are not equal.

Also in the embodiment shown in FIG. 4, the thickness 132 of actuator arm 114 is the same as that of actuator arm 116 or 118. In such an embodiment the neck height 168 shown in FIG. 3 is preferably but not necessarily equal to the neck height 178. However, in certain embodiments the thickness of the actuator arms may be unequal. For example, actuator arm 116 may be made thicker and stiffer than actuator arm 114 (or 118) to match one or more dynamic response frequencies in light of the fact that actuator arm 116 is a middle actuator arm that carries the mass of two HGAs (i.e. HGAs 138 and 140) rather than only one HGA. In an embodiment where actuator arm 116 is thicker than actuator arms 114 or 118, the neck height 178 will preferably but not necessarily exceed the neck height 168.

Figure 5:
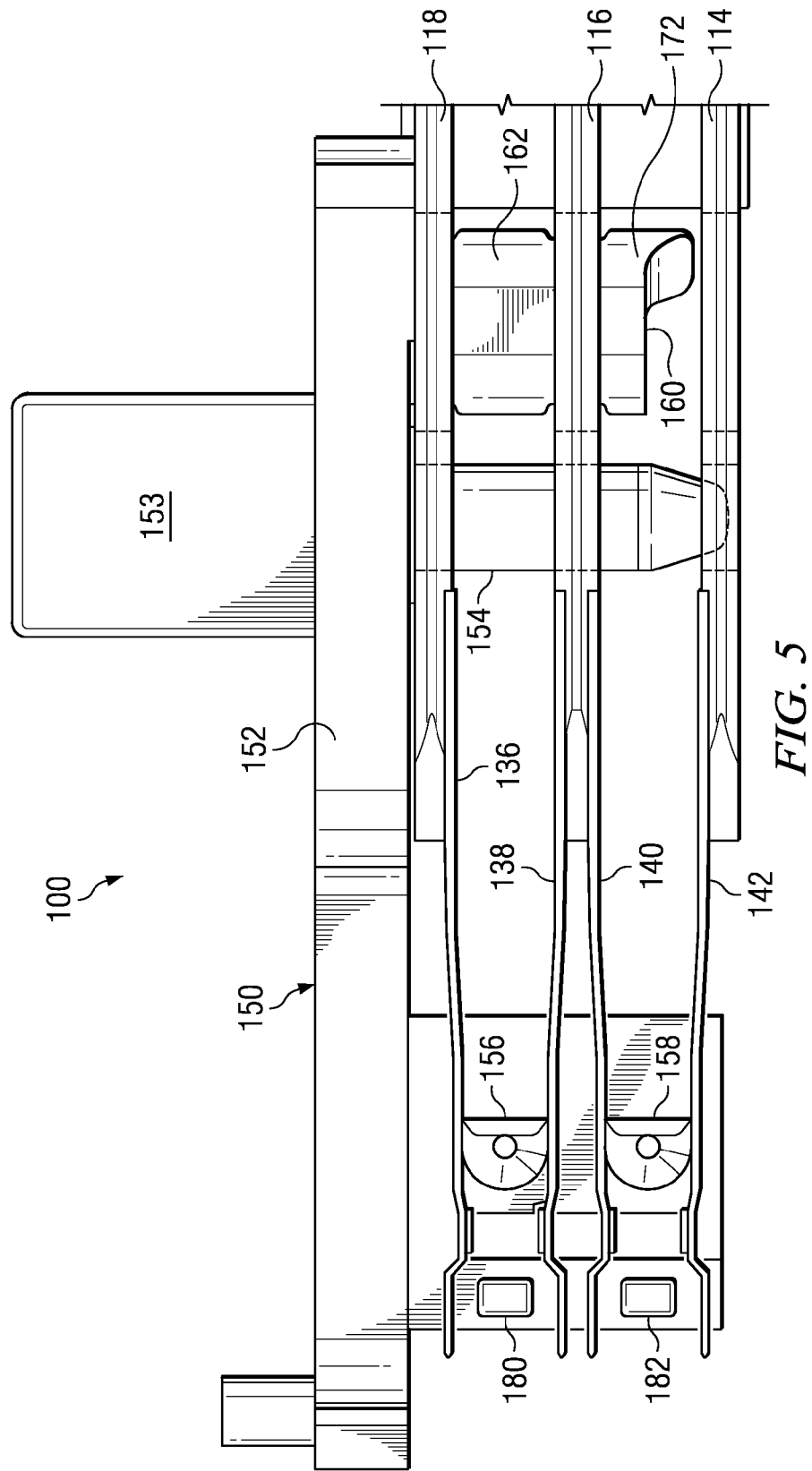
FIG. 5 is a side view of an HSA, with transport comb fully inserted, according to an embodiment of the present invention.

FIG. 5 depicts the HSA 100 with the transport comb 150 positioned such that the alignment pin 154 is fully inserted into the tooling hole 120 of actuator 110 and such that the restraining tower 160 is fully inserted into the mass-reduction opening 124 of actuator 110. More particularly, FIG. 5 depicts a specific amount of insertion which constitutes the second opportunity during insertion for the transport comb 150 to be rotated from the first angular orientation into the second angular orientation. The full insertion depicted in FIG. 5 represents an intended use of the transport comb 150 because it would serve to separate HGAs 136 and 138 from each other and it would serve to separate HGAs 140 and 142 from each other.

Because the restraining tower 160 of the transport comb 150 will not allow the transport comb 150 to be rotated from the first angular orientation into the second angular orientation except at the specific insertions depicted in FIG. 4 and in FIG. 5, the risk of handling damage to the HSA 100 may be reduced. Specifically, the risk of handling damage due to an impact by separator fingers 156, 158 into the side of one or more of HGAs 136, 138, 140, and/or 142, during the rotation of transport comb 150 into the second angular orientation, is reduced because such rotation is prevented by the restraining tower 160 except at a discrete number of safe insertion positions (i.e. in this embodiment, the insertion positions depicted in FIG. 4 and FIG. 5, respectively).

Figure 6A:
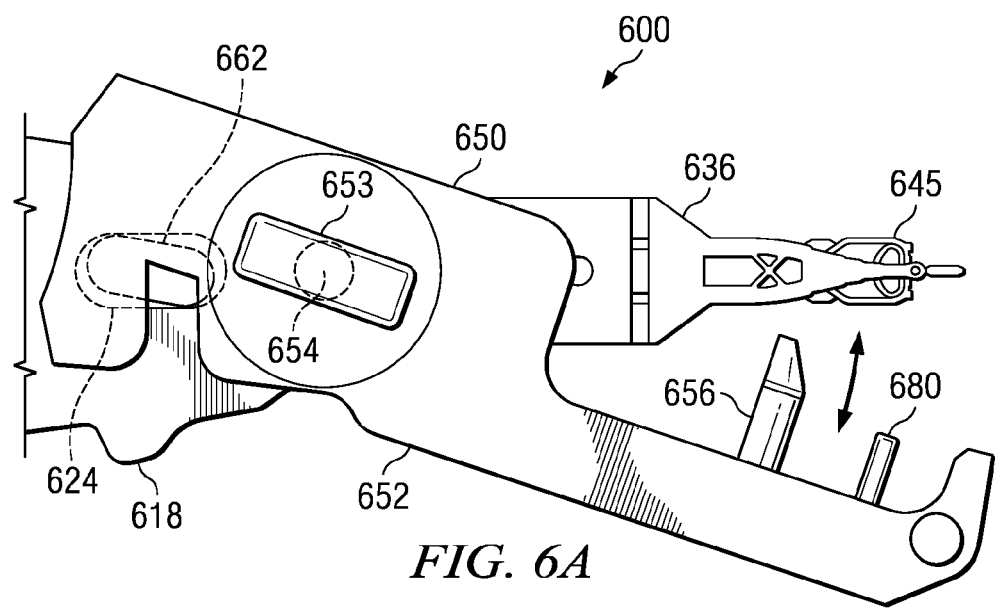
FIG. 6A depicts an HSA according to an embodiment of the present invention, having a transport comb in a first angular orientation.
Figure 6B:
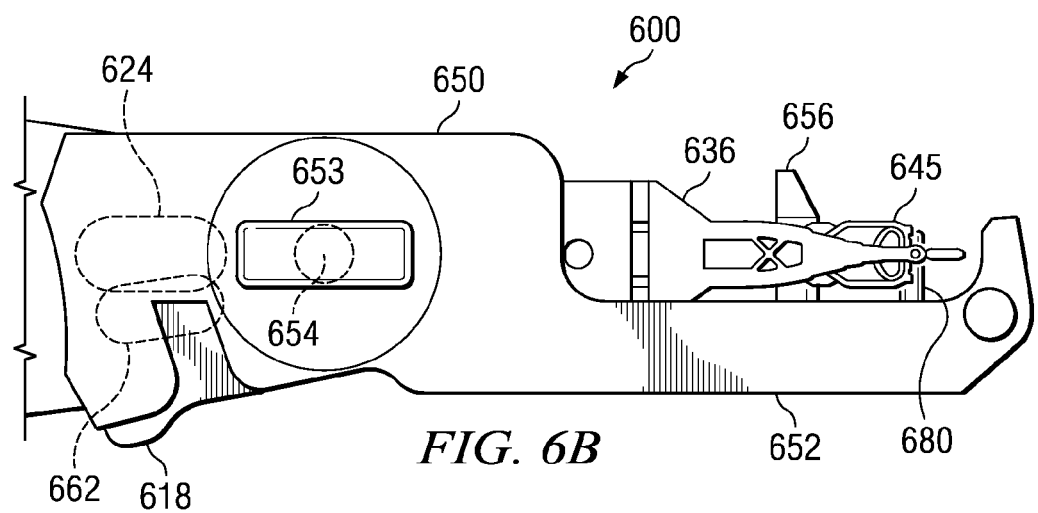
FIG. 6B depicts the HSA of FIG. 6A, with the transport comb in a second angular orientation.

FIGS. 6A and 6B depict an HSA 600 with a transport comb 650 according to an embodiment of the present invention. The transport comb 650 includes a comb body 652, at least one separator finger 656 that extends from the comb body 652, and a restraining tower that includes at least one lobe 662. In the embodiment of FIGS. 6A and 6B, the transport comb 650 also optionally includes a motion limiting projection 680.

The HSA 600 of FIGS. 6A and 6B includes at least one actuator arm 618 having a mass-reduction opening 624. In the embodiment of FIGS. 6A and 6B, the mass-reduction opening 624 is oval shaped, however the present invention contemplates that other shapes may be used for the mass-reduction opening (e.g., round, rectangular, oblong, irregular, triangular, or a combination of such shapes). At least one HGA 636 is attached to actuator arm 618.

In FIG. 6A, the transport comb 650 is depicted in a first angular orientation so that the separator finger 656 is not in contact with the suspension assembly of HGA 636, and so that the lobe 662 can fit within the mass-reduction opening 624. However, in FIG. 6B the transport comb 650 is shown in a second angular orientation where the separator finger 656 is in contact with the suspension assembly of HGA 636, but where the lobe 662 cannot fit within the mass-reduction opening 624 (e.g., the lobe 662 may be locked underneath the mass-reduction opening 624 so that the vertical position of the comb 650 relative to the actuator arm 618 is constrained). As can be seen by comparison of FIG. 6A with FIG. 6B, the first and second angular orientations are different by an angular difference about the alignment pin 654 that exceeds a rotation required to separate contact between the separator finger 656 and the suspension assembly of the HGA 636.

Under normal conditions, even with the transport comb 650 in the second angular orientation, the motion limiting projection 680 preferably does not contact flexure 645. However, with the transport comb 650 in the second angular orientation, and under conditions of mechanical shock, the motion limiting projection 680 may desirably interfere with excessive vertical travel of a flexure 645 of the suspension assembly of HGA 636. Such desirable interference may help reduce the likelihood of excessive deflection of the flexure 645 and, in so doing, reduce the likelihood of undesired and/or uncontrolled plastic deformation of the flexure 645.

In the embodiment of FIGS. 6A and 6B, whether the transport comb 650 can be rotated into the second angular orientation is preferably determined by the geometry of the restraining tower that includes the lobe 662 and extends from the comb body 652 into and/or through the mass-reduction opening 624. Specifically, whether the transport comb 650 can be rotated into the second angular orientation may be determined by the presence or absence of mechanical interference between the lobe 662 and an interior contour of the mass-reduction opening 624. Likewise, whether the transport comb 650 can be installed into the HSA 600 is also determined by the presence or absence of mechanical interference between the restraining tower with lobe 662 and an interior contour of the mass-reduction opening 624, so that such installation is permitted only when the separator finger 656 is angularly displaced away from the HGA 636. In the embodiment of FIGS. 6A and 6B, rotation of the transport comb 650 may be facilitated by a finger grip 653 that extends from the comb body 652.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

I claim:

1. A head stack assembly (HSA) comprising:
   an actuator including an actuator body and an actuator arm extending from the actuator body, the actuator arm including a tooling hole and a mass-reduction opening and defining an actuator arm thickness adjacent the mass-reduction opening;
   a head gimbal assembly (HGA), attached to the actuator arm, the HGA including a read head and a suspension assembly supporting the read head;
   a transport comb comprising:
      a comb body;
      an alignment pin extending from the comb body into the tooling hole of the actuator arm;
      at least one separator finger extending from the comb body, the separator finger in contact with the suspension assembly of the HGA with the transport comb in a second angular orientation with respect to the actuator arm, the separator finger not in contact with the suspension assembly of the HGA with the transport comb in a first angular orientation with respect to the actuator arm;
      a restraining tower extending from the comb body into the mass-reduction opening of the actuator arm, the restraining tower including
         a first lobe that fits within the mass-reduction opening with the transport comb in the first angular orientation, the first lobe not fitting within the mass-reduction opening with the transport comb in the second angular orientation; and
         a first neck that fits within the mass-reduction opening with the transport comb in the first and second angular orientations, the first neck having a neck height that is greater than the actuator arm thickness.

2. The HSA of claim 1 wherein the tooling hole is round and the alignment pin is round.

3. The HSA of claim 1 wherein the first and second angular orientations are different by an angular difference about the alignment pin that exceeds a rotation required to separate said contact between the at least one separator finger and the suspension assembly of the HGA.

4. The HSA of claim 1 wherein the first lobe is not concentric about the first neck.

5. The HSA of claim 1 wherein the mass-reduction opening is oblong.

6. A head stack assembly (HSA) comprising:
   an actuator including an actuator body and a plurality of actuator arms extending from the actuator body, each of the plurality of actuator arms including a tooling hole and a mass-reduction opening, each of the plurality of actuator arms being spaced apart from another by an actuator arm spacing, and defining an actuator arm thickness adjacent the mass-reduction opening;
   a plurality of head gimbal assemblies (HGAs), each of the plurality of HGAs attached to one of the plurality of actuator arms, each of the plurality of HGAs including a read head and a suspension assembly supporting the read head;
   a transport comb comprising:
      a comb body;
      an alignment pin extending from the comb body into the tooling hole of at least one of the plurality of actuator arms;
      at least one separator finger extending from the comb body, the separator finger in contact with two suspension assemblies of the plurality of HGAs with the transport comb in a second angular orientation with respect to the plurality of actuator arms, the separator finger not in contact with any suspension assembly of the plurality of HGAs with the transport comb in a first angular orientation with respect to the plurality of actuator arms;
      a restraining tower extending from the comb body into the mass-reduction opening of the at least one of the plurality of actuator arms, the restraining tower including
         a first lobe that fits within the mass-reduction opening with the transport comb in the first angular orientation, the first lobe not fitting within the mass-reduction opening with the transport comb in the second angular orientation, the first lobe having a lobe height that is less than the actuator arm spacing; and
         a first neck that fits within the mass-reduction opening with the transport comb in the first and second angular orientations, the first neck having a neck height that is greater than the actuator arm thickness.

7. The HSA of claim 6 wherein the tooling hole is round and the alignment pin is round.

8. The HSA of claim 6 wherein the first and second angular orientations are different by an angular difference about the alignment pin that exceeds a rotation required to separate said contact between the at least one separator finger and said two suspension assemblies of the plurality of HGAs.

9. The HSA of claim 6 wherein the first lobe is not concentric about the first neck.

10. The HSA of claim 6 wherein the mass-reduction opening is oblong.

11. The HSA of claim 6 wherein the restraining tower further comprises a second lobe that is offset from the first lobe by the actuator arm spacing.

12. The HSA of claim 6 wherein the comb body comprises a plastic material that is doped with lubricant.

13. The HSA of claim 12 wherein the comb body comprises a polycarbonate material doped with polytetrafluoroethylene (PTFE).

14. The HSA of claim 12 wherein the comb body comprises a polyetherimide material doped with polytetrafluoroethylene (PTFE).

15. The HSA of claim 6 wherein the comb body comprises a plastic material doped with a more electrically conductive material.

16. The HSA of claim 15 wherein the comb body comprises a liquid crystal polymer material doped with carbon.

* * * * *